United States Patent
Agarwal et al.

(10) Patent No.: US 10,103,991 B2
(45) Date of Patent: *Oct. 16, 2018

(54) SCALABILITY OF PROVIDING PACKET FLOW MANAGEMENT

(71) Applicant: CISCO TECHNOLOGY, INC., San Jose, CA (US)

(72) Inventors: Kaitki Agarwal, Westford, MA (US); Rajat Ghai, Sandwich, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,677

(22) Filed: Dec. 17, 2015

(65) Prior Publication Data

US 2016/0112323 A1 Apr. 21, 2016

Related U.S. Application Data

(63) Continuation of application No. 14/263,378, filed on Apr. 28, 2014, now Pat. No. 9,219,680, which is a
(Continued)

(51) Int. Cl.
*H04L 12/803* (2013.01)
*H04W 4/02* (2018.01)
(Continued)

(52) U.S. Cl.
CPC ............ *H04L 47/125* (2013.01); *H04L 45/38* (2013.01); *H04L 45/72* (2013.01); *H04L 45/74* (2013.01);
(Continued)

(58) Field of Classification Search
CPC ............ H04L 12/5689; H04L 29/0619; H04L 29/06197; H04L 29/0653; H04L 45/38;
(Continued)

(56) References Cited

U.S. PATENT DOCUMENTS 5,850,441 A 12/1998 Townsend et al.
5,892,924 A 4/1999 Lyon et al.
(Continued)

FOREIGN PATENT DOCUMENTS

CN 1640076 A 7/2005
CN 101589589 5/2014
(Continued)

OTHER PUBLICATIONS

3GPP TS 23.401 v8.3.0 (Sep. 2008), 3rd Generation Partnership Project; Technical Specification Group Services and System Aspects; General Packet Radio Services (GPRS) enhancements for Evolved Universal Terrestrial Radio Access Network (E/UTRAN) access (Release 8), http://www.3gpp.org (204 pages).
(Continued)

*Primary Examiner* — Khoa Huynh
(74) *Attorney, Agent, or Firm* — Patterson + Sheridan, LLP

(57) ABSTRACT

Systems and methods for managing packet flows in a communication network are provided. Packet information can be cached on different levels and used to avoid external queries. The cache information can also be correlated with other types of information, such as location information, to be able to serve that information quicker than if one or more external queries were to be made. A demux manager can provide routing and session setup, by routing packets that already have a session to the session manager and assigning packets to a session manager if they are not already assigned to a session. The tiered architecture also provides scalability to many users and minimizes delays even during high call volumes because the load can be distributed well across the gateway's resources.

17 Claims, 6 Drawing Sheets

Related U.S. Application Data continuation of application No. 11/952,980, filed on Dec. 7, 2007, now Pat. No. 8,724,463.

(60) Provisional application No. 60/873,493, filed on Dec. 7, 2006.

(51) Int. Cl.
| | | |
|---|---|---|
| *H04L 29/06* | (2006.01) | |
| *H04L 29/08* | (2006.01) | |
| *H04L 12/721* | (2013.01) | |
| *H04L 12/741* | (2013.01) | |
| *H04L 12/851* | (2013.01) | |
| *H04L 12/743* | (2013.01) | |

(52) U.S. Cl.
CPC ...... *H04L 45/7453* (2013.01); *H04L 47/2483* (2013.01); *H04L 65/102* (2013.01); *H04L 65/103* (2013.01); *H04L 65/105* (2013.01); *H04L 65/1016* (2013.01); *H04L 65/1046* (2013.01); *H04L 65/80* (2013.01); *H04L 67/18* (2013.01); *H04W 4/02* (2013.01); *H04L 29/06197* (2013.01); *H04L 65/1006* (2013.01); *Y10S 707/912* (2013.01); *Y10S 707/913* (2013.01); *Y10S 707/918* (2013.01)

(58) Field of Classification Search
CPC . H04L 45/74; H04L 47/2441; H04L 47/2483; H04L 65/80; H04L 65/103; H04L 65/1003; H04L 65/1006; H04L 65/1066; H04L 67/18; H04L 1/5689; H04L 45/72; H04L 45/7453; H04L 47/125; H04L 65/102; H04L 65/105; H04L 65/1016; H04L 65/1046; H04W 4/02; H04W 8/082; H04W 8/18; H04W 28/0289; H04W 28/08; Y10S 707/912; Y10S 707/913; Y10S 707/918

See application file for complete search history.

(56) References Cited

U.S. PATENT DOCUMENTS

| | | | |
|---|---|---|---|
| 6,119,234 A | | 9/2000 | Aziz et al. |
| 6,138,156 A | | 10/2000 | Fletcher et al. |
| 6,327,471 B1 | | 12/2001 | Song |
| 6,431,875 B1 | | 8/2002 | Elliott et al. |
| 6,434,117 B1 | | 8/2002 | Momona |
| 6,477,590 B1 | | 11/2002 | Habusha et al. |
| 6,687,252 B1 | | 2/2004 | Bertrand et al. |
| 6,714,987 B1 | | 3/2004 | Amin et al. |
| 6,775,273 B1 | | 8/2004 | Kung et al. |
| 6,778,494 B1 | | 8/2004 | Mauger |
| 6,792,461 B1 | | 9/2004 | Hericourt |
| 6,810,259 B1 | | 10/2004 | Zhang |
| 6,847,991 B1 | | 1/2005 | Kurapati |
| 6,853,630 B1 | | 2/2005 | Manning |
| 6,854,014 B1 | | 2/2005 | Amin et al. |
| 6,888,821 B2 | | 5/2005 | Rasanen et al. |
| 6,973,309 B1 | | 12/2005 | Rygula et al. |
| 6,978,380 B1 | | 12/2005 | Husain et al. |
| 6,996,087 B2 | | 2/2006 | Ejzak |
| 7,222,359 B2 | | 5/2007 | Freund et al. |
| 7,443,797 B2 | | 10/2008 | Cheung et al. |
| 7,454,206 B1 | | 11/2008 | Phillips et al. |
| 7,474,894 B2 | | 1/2009 | Cardina et al. |
| 7,613,836 B2 | | 11/2009 | Tober et al. |
| 7,702,785 B2 | | 4/2010 | Bruton, III et al. |
| 7,817,635 B2 | | 10/2010 | Akhtar et al. |
| 8,085,775 B1* | | 12/2011 | Pappu ................. H04L 47/2441 370/392 |
| 8,200,827 B1 | | 6/2012 | Hunyady et al. |
| 8,724,463 B2 | | 5/2014 | Agarwal et al. |
| 9,219,688 B2 | | 12/2015 | Agarwal et al. |
| 2001/0026550 A1 | | 10/2001 | Kobayashi |
| 2002/0029260 A1 | | 3/2002 | Dobbins et al. |
| 2002/0031131 A1 | | 3/2002 | Yemini et al. |
| 2002/0131404 A1 | | 9/2002 | Mehta et al. |
| 2002/0152179 A1 | | 10/2002 | Racov |
| 2002/0154645 A1* | | 10/2002 | Hu .......................... H04L 29/06 370/401 |
| 2003/0016630 A1 | | 1/2003 | Veqa/Garcia et al. |
| 2003/0026260 A1 | | 2/2003 | Ogasawara et al. |
| 2003/0050076 A1 | | 3/2003 | Watanabe |
| 2003/0055962 A1 | | 3/2003 | Freund et al. |
| 2003/0058839 A1* | | 3/2003 | D'Souza ........... H04L 29/06027 370/352 |
| 2003/0058872 A1* | | 3/2003 | Berggreen ............ H04L 45/745 370/401 |
| 2003/0154400 A1* | | 8/2003 | Pirttimaa ................. H04L 29/06 726/14 |
| 2003/0182435 A1 | | 9/2003 | Redlich et al. |
| 2003/0188012 A1 | | 10/2003 | Ford |
| 2003/0225897 A1 | | 12/2003 | Krawetz |
| 2003/0227880 A1 | | 12/2003 | Heller et al. |
| 2003/0229697 A1 | | 12/2003 | Borella |
| 2004/0006573 A1 | | 1/2004 | Takashi |
| 2004/0009761 A1 | | 1/2004 | Money et al. |
| 2004/0047290 A1 | | 3/2004 | Komandur et al. |
| 2004/0054929 A1 | | 3/2004 | Serpa |
| 2004/0068574 A1 | | 4/2004 | Costa Requena et al. |
| 2004/0109414 A1 | | 6/2004 | Choi et al. |
| 2004/0109459 A1 | | 6/2004 | Madour et al. |
| 2004/0111476 A1 | | 6/2004 | Trossen et al. |
| 2004/0122954 A1 | | 6/2004 | Shaheen |
| 2004/0122967 A1 | | 6/2004 | Bressler et al. |
| 2004/0137918 A1 | | 7/2004 | Varonen et al. |
| 2004/0139230 A1 | | 7/2004 | Kim |
| 2004/0152469 A1 | | 8/2004 | Yla/Outinen et al. |
| 2004/0181686 A1 | | 9/2004 | Krause et al. |
| 2004/0224688 A1 | | 11/2004 | Fischer |
| 2004/0228331 A1 | | 11/2004 | Hansen et al. |
| 2004/0252694 A1 | | 12/2004 | Adhikari et al. |
| 2005/0002381 A1 | | 1/2005 | Westman et al. |
| 2005/0005025 A1 | | 1/2005 | Harville |
| 2005/0009520 A1 | | 1/2005 | Herrero et al. |
| 2005/0021713 A1 | | 1/2005 | Dugan et al. |
| 2005/0083974 A1 | | 4/2005 | Mayer et al. |
| 2005/0111450 A1 | | 5/2005 | Miyamoto et al. |
| 2005/0124341 A1 | | 6/2005 | Myllymaki et al. |
| 2005/0171937 A1* | | 8/2005 | Hughes ............. G06F 17/30949 |
| 2005/0190740 A1 | | 9/2005 | Zhao et al. |
| 2005/0201357 A1 | | 9/2005 | Poyhonen |
| 2005/0204052 A1 | | 9/2005 | Wanq et al. |
| 2005/0220095 A1 | | 10/2005 | Narayanan et al. |
| 2005/0233727 A1 | | 10/2005 | Poikselka et al. |
| 2006/0015615 A1 | | 1/2006 | Merle et al. |
| 2006/0025132 A1 | | 2/2006 | Karaoguz et al. |
| 2006/0031536 A1 | | 2/2006 | Eydelman et al. |
| 2006/0031559 A1 | | 2/2006 | Sorokopud et al. |
| 2006/0045064 A1 | | 3/2006 | Qin et al. |
| 2006/0046714 A1 | | 3/2006 | Kalavade |
| 2006/0058056 A1 | | 3/2006 | Das et al. |
| 2006/0067244 A1 | | 3/2006 | Sekaran et al. |
| 2006/0069776 A1 | | 3/2006 | Shim et al. |
| 2006/0104431 A1 | | 5/2006 | Emery et al. |
| 2006/0146792 A1 | | 7/2006 | Ramachandran et al. |
| 2006/0155871 A1 | | 7/2006 | Ilkka et al. |
| 2006/0193295 A1 | | 8/2006 | White et al. |
| 2006/0211423 A1 | | 9/2006 | Ejzak et al. |
| 2006/0239255 A1 | | 10/2006 | Ramachandran et al. |
| 2006/0251050 A1 | | 11/2006 | Karlsson |
| 2006/0256751 A1 | | 11/2006 | Jagadeesan et al. |
| 2006/0256779 A1 | | 11/2006 | Lim et al. |
| 2006/0264213 A1 | | 11/2006 | Thompson |
| 2006/0270404 A1 | | 11/2006 | Tuohino et al. |
| 2006/0291412 A1 | | 12/2006 | Naqvi et al. |
| 2007/0022199 A1 | | 1/2007 | Tatsubori |
| 2007/0025301 A1 | | 2/2007 | Petersson et al. |
| 2007/0036078 A1 | | 2/2007 | Chowdhury et al. |
| 2007/0036079 A1 | | 2/2007 | Chowdury et al. |
| 2007/0041320 A1 | | 2/2007 | Chen et al. |

(56) References Cited

U.S. PATENT DOCUMENTS

| | | |
|---|---|---|
| 2007/0058561 A1 | 3/2007 | Virgile |
| 2007/0066286 A1 | 3/2007 | Hurtta |
| 2007/0076729 A1 | 4/2007 | Takeda |
| 2007/0082681 A1 | 4/2007 | Kim et al. |
| 2007/0097967 A1 | 5/2007 | Kauppinen et al. |
| 2007/0118656 A1 | 5/2007 | Anderson et al. |
| 2007/0121490 A1* | 5/2007 | Iwakawa ............ H04L 67/1008 370/218 |
| 2007/0156869 A1 | 7/2007 | Galchev et al. |
| 2007/0184779 A1 | 8/2007 | Park et al. |
| 2007/0195805 A1 | 8/2007 | Lindgren |
| 2007/0206515 A1 | 9/2007 | Andreasen et al. |
| 2007/0206617 A1 | 9/2007 | Andreasen et al. |
| 2007/0209061 A1 | 9/2007 | Dekeyzer et al. |
| 2007/0253371 A1 | 11/2007 | Harper et al. |
| 2007/0254673 A1 | 11/2007 | Stenberg et al. |
| 2007/0271379 A1 | 11/2007 | Carlton et al. |
| 2008/0002592 A1 | 1/2008 | Yegani et al. |
| 2008/0013533 A1 | 1/2008 | Bogineni et al. |
| 2008/0020775 A1 | 1/2008 | Willars |
| 2008/0052387 A1 | 2/2008 | Heinz et al. |
| 2008/0080525 A1 | 4/2008 | Chatilov et al. |
| 2008/0084867 A1 | 4/2008 | Foti et al. |
| 2008/0095339 A1 | 4/2008 | Elliott et al. |
| 2008/0130637 A1 | 6/2008 | Kant et al. |
| 2008/0137541 A1 | 6/2008 | Agarwal et al. |
| 2008/0219218 A1 | 9/2008 | Rydnell et al. |
| 2008/0233947 A1 | 9/2008 | Herrero/Veron |
| 2008/0254768 A1 | 10/2008 | Faccin |
| 2008/0261557 A1 | 10/2008 | Sim |
| 2009/0054037 A1 | 2/2009 | Kaippallimalil |
| 2009/0109845 A1 | 4/2009 | Andreasen et al. |
| 2009/0129388 A1 | 5/2009 | Akhtar et al. |
| 2009/0285225 A1 | 11/2009 | Dahod |
| 2010/0006744 A1 | 1/2010 | Kochi |
| 2011/0199978 A1 | 8/2011 | Phan/Anh et al. |
| 2014/0369354 A1 | 12/2014 | Agarwal et al. |

FOREIGN PATENT DOCUMENTS

| | | |
|---|---|---|
| EP | 1089515 | 4/2001 |
| EP | 1414212 | 4/2004 |
| EP | 1492275 | 12/2004 |
| EP | 1528744 | 5/2005 |
| EP | 1832069 | 7/2006 |
| EP | 2092766 | 8/2009 |
| EP | 2095585 | 9/2009 |
| WO | WO/01/22642 | 3/2001 |
| WO | WO 02/09365 | 1/2002 |
| WO | WO/2005064978 | 7/2005 |
| WO | WO/07/081727 | 7/2007 |
| WO | WO2008/070869 | 6/2008 |
| WO | WO2008/070870 | 6/2008 |
| WO | WO/09/067445 | 5/2009 |

OTHER PUBLICATIONS

3GPP TS 29.274 v1.3.0 (Oct. 2008), 3rd Generation Partnership Project; Technical Specification Group Core Network and Terminals; 3GPP Evolved Packet System; Evolved GPRS Tunnelling Protocol for Control Plane (GTPv2/CO; Stage 3 (Release 8); http://www.3gpp.org (1 page).
3GPP TS 36.413 v8.3.0 (Sep. 2008), 3rd Generation Partnership Project; Technical Specification Group Radio Access Network; Evolved Universal Terrestrial Radio Access Network (E/UTRANO); S1 Application Protocol (S1AP) (Release 8), http://www.3gpp.org (184 pages).
Brandt, et al., "A Gateway Architecture for Mobile Multimedia Streaming", European Symposium on Mobile Media Delivery, Sep. 20, 2006 (5 pages).
CT Labs Report, "SIP and RTP Denial of Service Attack Tests Summary Report", pp. 1/4, 2005.
Gouya, et al., "SCIM (Service Capability Interaction Manager) Implementation Issues in IMS Service Architecture", IEEE International Conference on Communications, 2006 (7 pages).
International Search Report and Written Opinion for corresponding International Patent Application No. PCT/US2007/086884 dated Apr. 10, 2008 (4 pages).
Montes, et al., "Deployment of IP Multimedia Streaming Services in Third/Generation Mobile Networks", IEEE Wireless Communications, Oct. 2002 (9 pages).
Supplementary European Search Report issued in EP 07865428, dated Dec. 16, 2011, (6 pages).
Government of India Patent Office dated Feb. 20, 2015 First IN Examination Report from IN2174/KOLNP/2009.
PCT Jun. 10, 2009 International Preliminary Report on Patentability for International Application PCT/US2007/086886.
EPO Mar. 10, 2016 Supplementary Search Report and Written Opinion from European Application Serial No. EP07865430; 6 pages.
PRC Sep. 30, 2016 SIPO $1^{st}$ Office Action from Chinese Application Serial No. 201410138720.4; 11 pages.
"3GPP: Testing Time for TS 24.229," <http://www.3gpp.org/ftp/Specs/html/info/24229.htm> printed on Dec. 5, 2009 (4 pages).
"Acme Packet: Delivering enterprise cost savings with SIP Trunking and SBCs," <http://www.acmepacket.com/html/page.asp?PageID=%7bFB2657BA/EE7A/46C1/BEA8/F650C93BF5C3%7d> first published on or after Jun. 2010 (19 pages).
International Search Report and Written Opinion for corresponding International Patent Application No. PCT/US2009/043696 dated Jun. 24, 2009 (5 pages).
International Search Report and Written Opinion for PCT Application No. PCT/US07/86808 dated Apr. 10, 2008 (6 pages).
International Search Report and Written Opinion for PCT Application No. PCT/US07/86886 dated Apr. 10, 2008 (7 pages).
International Search Report and Written Opinion for PCT Application No. PCT/US2008/83911 dated Jan. 12, 2009 (5 pages).
International Search Report and Written Opinion issued for International Patent Application No. PCT/US2007/086802 dated May 20, 2008 (6 pages).
International Search Report for International Application No. PCT/US09/64823 dated Feb. 12, 2010 (1 page).
Nguyen/Vuong. "Mobility Management in 4G Wireless Heterogeneous Networks", PhD thesis. Jul. 2, 2008. www.biblio.univ.evry.fr/theses/2008/2008EVRY00007.pdf (182 pages).

* cited by examiner

SCALABILITY OF PROVIDING PACKET FLOW MANAGEMENT

CROSS REFERENCE TO RELATED APPLICATION

This Application is a continuation (and claims the benefit of priority under 35 U.S.C. § 120) of U.S. application Ser. No. 14/263,378, filed Apr. 28, 2014, entitled "SCALABILITY OF PROVIDING PACKET FLOW MANAGEMENT," Inventors Kaitki Agarwal, et al., which is a continuation (and claims the benefit of priority under 35 U.S.C. § 120) of U.S. application Ser. No. 11/952,980, filed Dec. 7, 2007, entitled "SCALABILITY OF PROVIDING PACKET FLOW MANAGEMENT," Inventors Kaitki Agarwal, et al., now issued as U.S. Pat. No. 8,724,463, which claims benefit under 35 U.S.C. § 119(e) of U.S. Provisional Patent Application No. 60/873,493, entitled "APPARATUS AND METHOD FOR PROVIDING A CALL SESSION CONTROL FUNCTION," filed Dec. 7, 2006. The disclosures of the prior applications are considered part of (and are incorporated by reference in) the disclosure of this application.

FIELD OF THE DISCLOSURE

This disclosure relates to a system and method for providing packet flow management in a communication network.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. A mobile node can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is setup, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the setup and teardown of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The packet flow may include a number of packets or a single packet. Services may be applied to a packet flow such as lawful interception (wire tapping), Virtual Private Networks (VPNs), and firewalls.

A part of the evolution of packet based communications has been the development of IP Multimedia Subsystem (IMS). IMS is an architectural framework for delivering internet protocol (IP) multimedia to mobile nodes. A call session control function (CSCF) can manage much of the signaling that occurs in an IMS core. The CSCF functionality can be logically divided into three functionalities: a Proxy-CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The $3^{rd}$ Generation Partnership Project (3GPP) is responsible for IMS which works with GSM systems and the $3^{rd}$ Generation Partnership Project 2 (3GPP2) is responsible for Multimedia Domain (MMD) which is used with CDMA systems and is based on the 3GPP IMS concept. With both IMS and MMD, several different functions are described and problems can arise if packet flows are not managed among the functions.

SUMMARY OF THE DISCLOSURE

Systems and methods for providing packet flow management in a communication network are disclosed. In some embodiments, a gateway in a communication network includes a demux manager residing in the gateway that processes one or more incoming packets, caches information relating to new process instance assignments, and allocates a process instance to a new packet flow, a process instance that caches information relating to sessions the process instance is handling in a computer readable medium in the gateway, and a network processing unit flow residing in the gateway that is setup by the process instance to route incoming packets that match specified information to a corresponding process instance.

In certain embodiments, a method of processing packets includes receiving a packet at a gateway, determining if the packet matches a limited set of criteria, and if there is a match forwarding the packet to a corresponding process instance, otherwise forwarding to a demux manager, analyzing the packet at the demux manager to determine whether to assign a new process instance to handle a new packet flow and determining how to route the packet, and receiving a new packet at a process instance that is assigned from the demux manager and creating a cache entry with information from the new packet.

DETAILED DESCRIPTION

Systems are methods for providing management of packet-based flows on a communication network are disclosed in some embodiments. A gateway may be used to implement the management of packet flows for IP multimedia subsystem (IMS) and multimedia domain (MMD) architectures. Directing packet flows and providing physical mapping of IMS and MMD functions can be provided by a combination of hardware and software. Residing within the gateway can be one or more network processing units, line cards, as well as packet and voice processing cards. Software modules such as a network processing unit (NPU) flow, a demux manager, a session manager, and a registrar can provide physical mapping and packet flow direction among the many functions. The software modules can also be setup to provide the physical mapping and packet flow direction in a scalable fashion, so heavy call volumes can be distributed to minimize call/session setup delays in some embodiments.

Figure 1:
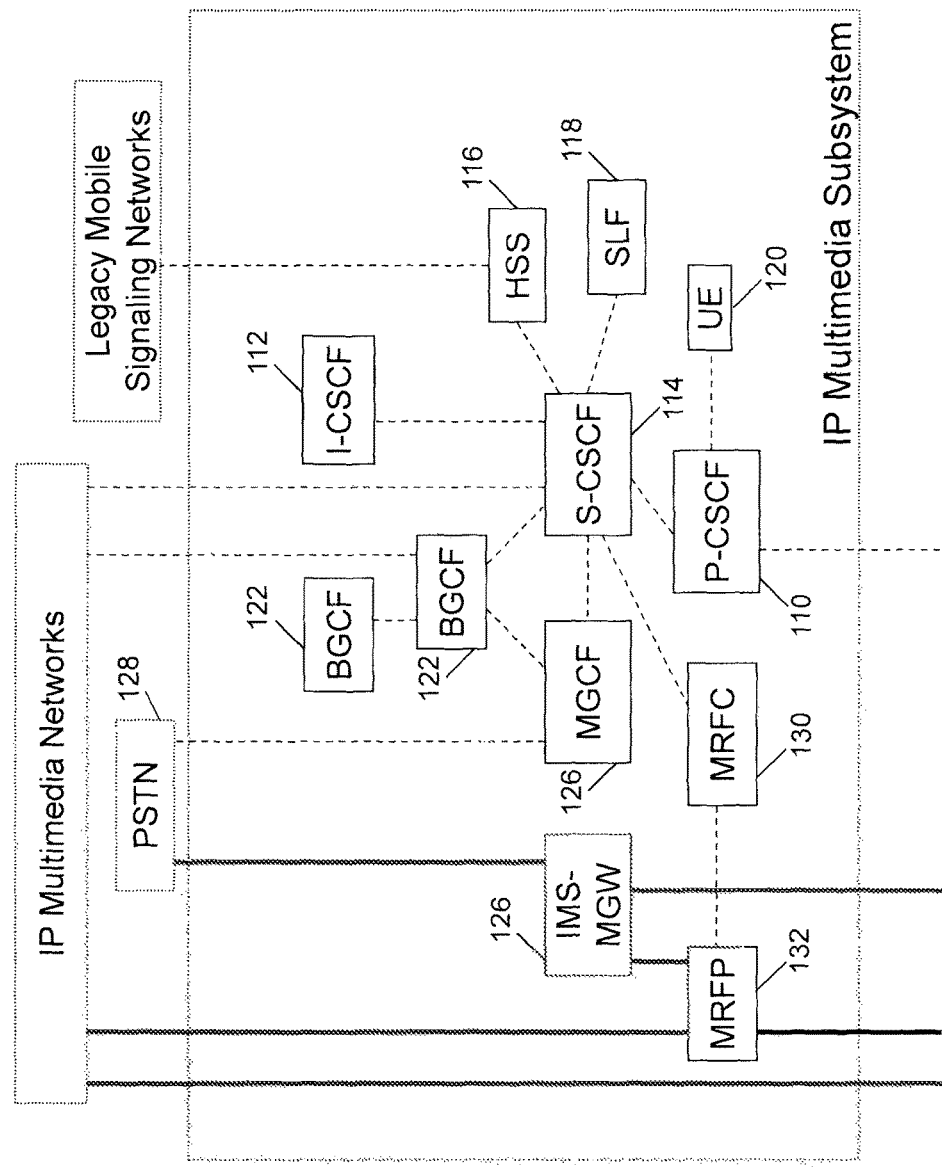
FIG. 1 is a block diagram illustrating an IP multimedia subsystem (IMS) architecture in accordance with certain embodiments.

FIG. 1 illustrates an IP multimedia subsystem (IMS) where logical components of a network setup are shown in accordance with some embodiments. FIG. 1 includes a P-CSCF 110, an I-CSCF 112, a S-CSCF 114, a Home Subscriber Server (HSS) 116, a Subscriber Location Function (SLF) 118, User Equipment (UE) 120, Breakout Gateway Control Function (BGCF) 122, Media Gateway Control Function (MGCF) 124, Media Gateway (MGW) 126, Public Switched Telephone Network (PSTN) 128, Multimedia Resource Controller (MRFC) 130, and Multimedia Resource Function Processor (MRFP) 132. HSS 116 is a master user database that supports the S-CSCF or other network entities that handle calls and sessions. HSS 116 stores subscription-related information such as user profiles, performs user authentication and authorization, and can provide information about the physical location of the user. When multiple HSSs are used in a network a SLF 118 can be used to direct the queries to HSS 116 storing the information. Legacy signaling networks may also use the HSS for services. MRFC 130 communicates with S-CSCF 114 and controls the MRFP 132 to implement media related functions. The combination of MRFC 130 and MRFP 132 provides a source of media in the home network. BGCF 122 is a server that can route based on telephone number and is used when calling to a phone on the circuit switched network. MGCF 124 and MGW 126 are used to convert signaling from IMS to that which is appropriate for PSTN 128 circuit switched networks. The IP Multimedia Networks can include application servers and other network entities that provide services to user equipment (or mobile node) 120. The user equipment (or mobile node) can include a cell phone, a personal digital assistant (PDA), or a laptop computer.

Figure 2:
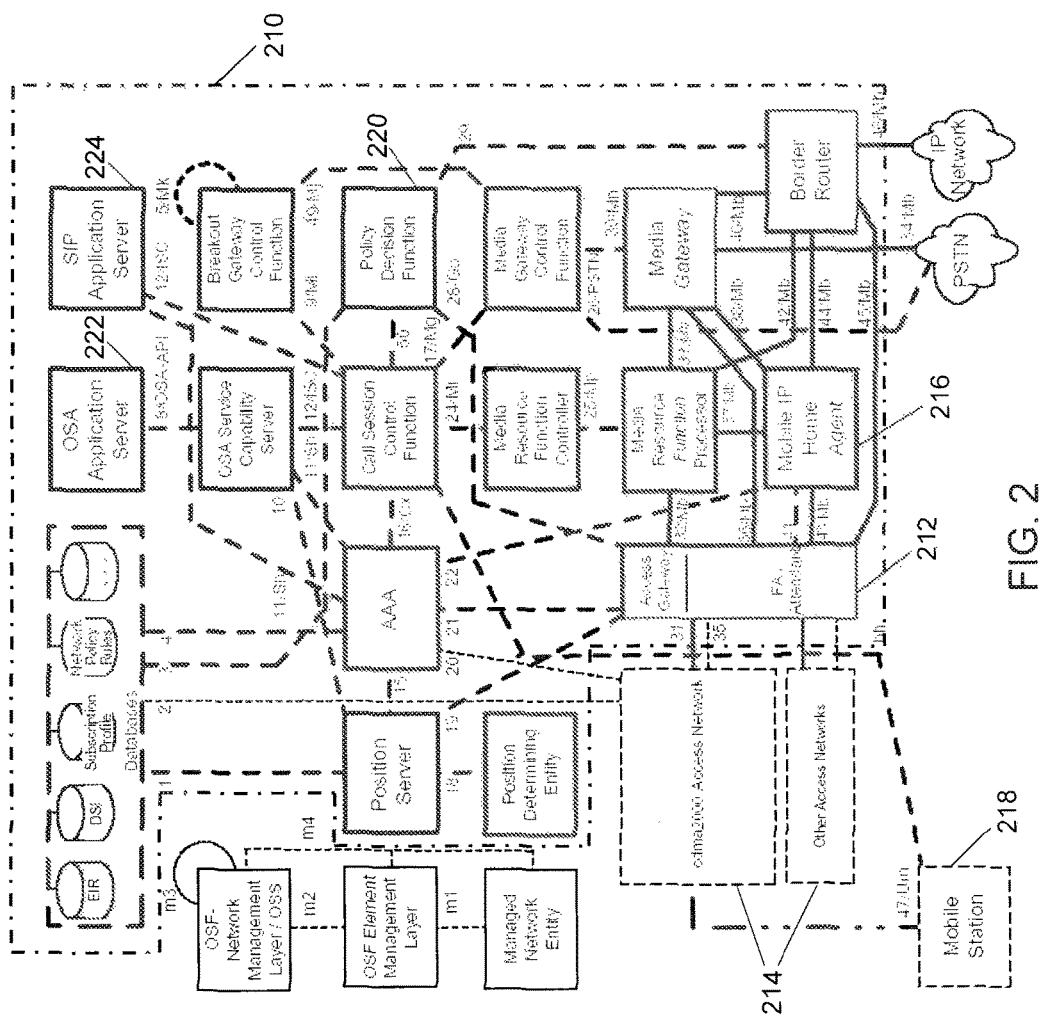
FIG. 2 is a block diagram illustrating a multimedia domain (MMD) architecture in accordance with certain embodiments.

FIG. 2 illustrates a Multimedia Domain (MMD) system 210 within a larger network. The MMD system 210 includes many of the same functions as the IMS system of FIG. 1, but further includes an access gateway/foreign agent 212 to communicate with access networks 214, as well as a home agent 216 to provide Mobile IP support to mobile stations 218 (or mobile node). A policy decision function (PDF), which can be included in a IMS or MMD network stores policies governing a user's session. Application servers such as an open systems architecture (OSA) application server 222 and SIP application server 224 provide applications such as location based services, video, email, chat, gaming, and other data and multimedia content.

As shown in FIGS. 1 and 2 a number of functions can be included in IMS and MMD networks. Several of these functions are used in providing, for example, voice over IP (VoIP) routing and enhanced services, such as enhanced charging, stateful firewalls, traffic performance optimization (TPO). In some embodiments, one or more of these functions can be provided by a single entity in the network such as a gateway. The physical mapping of these function to entities in the network, can be performed to minimize session setup delay and ease management of physical entities even as the number of sessions increases. As the number of sessions increases, the load may need to be distributed among one or more entities that perform the same task, entities which can be either logical and internal to the gateway or physical.

Figure 3:
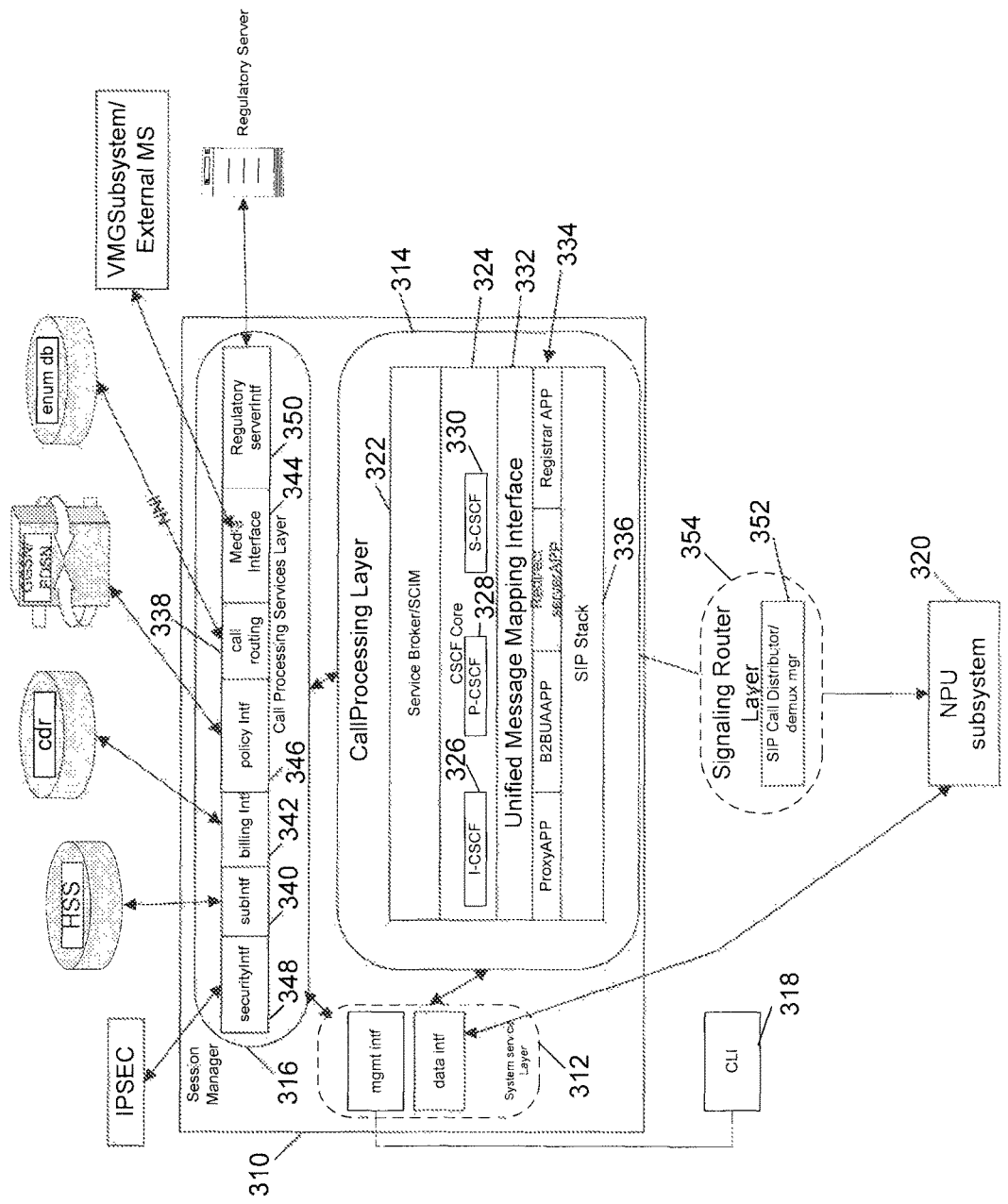
FIG. 3 is a block diagram of components of a gateway for managing packet flows in accordance with certain embodiments.

FIG. 3 illustrates a control plane architecture for a gateway in accordance with certain embodiments. A session manager 310 services and processes user session data flow for user equipment/mobile subscribers. Session manager 310, which is the same session manager as described above, includes functional layers such as a system service layer 312, a call processing layer 314, and a call processing support services layer 316. The system services layer 312 provides an interface for instructions to be passed to the session manager and the other layers. A command line interface (CLI) 318 as well as network processing unit 320 interface are included. The call processing layer 314 includes a service broker/Service Control Interaction Manager (SCIM) 322, a CSCF core 324 that includes an I-CSCF 326, P-CSCF 328, and S-CSCF 330, a unified message mapping interface 332, applications 334, and a SIP stack 336. Applications 334 includes registrar function. The registrar function caches information relating to the subscriber and the session enabling lookup of information without having to query external databases. In some embodiments, the CSCF core includes one of the CSCF functionalities, for example, the P-CSCF. The call processing support services layer 316 includes a variety of services such as routing and address translation service 338, subscriber management service 340, changing interface service 342, media interface service 344, QoS policy interface service 346, security interface 348, and regulatory server interface 350.

Looking at the call processing layer 314, this layer includes signaling protocols and call control using universal SIP as an application program interface (API). The signaling protocols can be SIP or can be other protocols like ISUP, MGCP, or H.323. Further, the call processing layer 314 allows interworking between SIP variants and other protocols through a unified mapping interface. The unified mapping interface can convert protocol specific messages and parameters to a universal SIP like API format. SIP like messaging is used, in some embodiments, because SIP has the largest message set and can cover the possible messaging scenarios for SIP and the other protocols. The call processing layer 314 can also provide transparency to data that need not be processed by the CSCF core by placing that information into an envelope. Parameters that are not of interest can be placed in an envelope and remain unmodified. The CSCF core allows any text string as the calling and called number, and the number does not need to be restricted to an E.164 number. The number could be, for example, an Address of Record (AoR) or any name string with a domain name.

The gateway can implement a number of different approaches for providing scalability and session initiation protocol (SIP) packet flow management in some embodiments. A port number based routing approach provides a subscriber a port for sending and receiving requests and responses. The port directs the request and responses to the session manager assigned to the subscriber. A NPU flow can be installed on that port to recognize packet flows originating from a particular subscriber. In another approach, for example, packets/messages can go through a SIP demux manager, and the SIP demux manager can direct the packets/message to the appropriate session manager instance or function. In other embodiments, a NPU flow can be installed for each registered mobile node based the mobile node's IP address and port number. The NPU flow can be installed by the registrar function of the session manager in certain embodiments. When a mobile node sends its contact IP address and port number as part of the registration process, the registrar can cache the contact information and install the NPU flow for the destination IP address and port number.

A demux manager 352 resides in the signal routing layer 354, as shown in FIG. 3. The signal routing layer 354 with the demux manager can determine where a packet flow is sent for processing. The packet flow can be sent to a process instance for further processing and/or signal handling. The demux manager can be used to analyze packet flows or traffic entering into a gateway. This analyzing may encompass packet sniffing, extracting of information from packet headers, sorting extracted information, deep packet inspection, and processing of information obtained from one or more packets. Messages analyzed by a demux manager can contain information which can be extracted (or sniffed) such as an IP-address assigned to the mobile node, a network access identifier (NAI), an international mobile subscriber identity (IMSI), a mobile subscriber identification (MSID), a correlation-ID (for CDMA implementations), a user data record (UDR), event data records (EDR), a calling-station-ID, and/or any other applicable information.

The demux manager can also direct packet flows among functions internal to the gateway and physical entities to which other functions are mapped. In directing packet flows, demux manager can steer packet flows to balance loads. For example, if a packet is to be sent to more than one function and order does not matter, the demux manager sends the packet to the least loaded or a less congested function. The demux manager, in some embodiments, can determine congestion based on outstanding packets at different functions or from the delay when one or more packets return to the demux manager. Information extracted from packets can be cached locally in the signal routing layer to allow processing to occur without retrieving information from external databases.

In certain embodiments, incoming packets are sent to a first in, first out (FIFO) queue in the demux manager. The packet at the head of the queue is de-queued and inspected to see how long the packet has been waiting in the queue. If the packet has waited longer than a pre-set time, the packet is deemed to be too old and dropped. Otherwise, the packet is inspected to see if a new session is to be established or if the packet is to be routed to a session manager instance or other function. If a new session is to be established, a session manager selection routine is invoked and the packet is forwarded to the selected session manager. Packets that belong to an already established session are forwarded to the corresponding session manager previously selected. A demux manager can keep a list of the session managers and assign a weighted load factor to each session manager. The list is sorted by the weighted load factor so the least loaded session manager can be selected for a new session.

The load factor can be determined by calculating the following parameters: the number of active sessions, dormant sessions, outstanding requests, round trip time, and the load on the processing unit where the session manager is running, in some embodiments. The load factor can be calculated by obtaining a maximum value for each of the parameters and determining how each session manager is relative to the maximum. Each of the parameters is assigned a percentage with the total adding to 100. The parameters and the list sort order can be periodically updated. Depending on the availability and load levels indicated in the list, new sessions managers can also be added dynamically.

As mentioned above, the demux manager inspects the packets and completes a certain amount of processing, in certain embodiments. The processing can involve parsing the packet header to extract information in some of the fields, with some or all of this information being cached, if the information is not stored already. The information can be used to verify the packet's authenticity (e.g., the packet is not part of some attack on the system) and to validate that the packet is not malformed. The information that can be cached includes Contact (IP address/Fully qualified domain name of mobile node) and Address of record/Public user Id. The packet is then routed to the session manager handling the packet's session.

Figure 4:
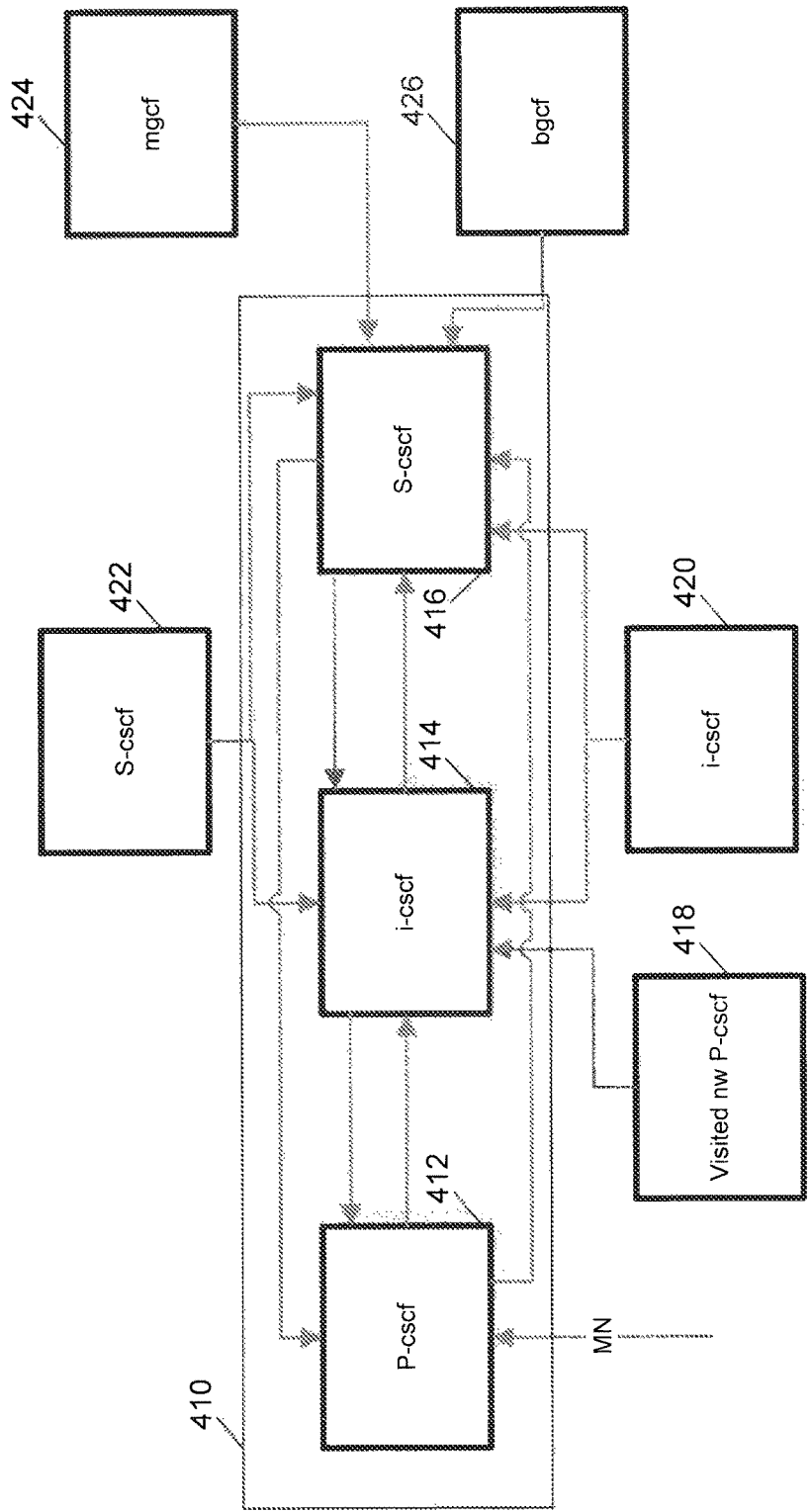
FIG. 4 is a block diagram of flows through a gateway and among functions in accordance with certain embodiments.

Demux manager provides direction handling of packets for a collapsed call session control function (CSCF), in certain embodiments, which can be implemented on the gateway and with external CSCF entities. Direction handling can be implemented based on a rule or rule set in a collapsed CSCF in some embodiments. FIG. 4 illustrates CSCF component interaction in accordance with certain embodiments. FIG. 4 includes a gateway 410, a collapsed P-CSCF 412, a collapsed I-CSCF 414, a collapsed S-CSCF 416, a visited network P-CSCF 418, an I-CSCF 420, a S-CSCF 422, a media gateway control function (MGCF) 424, and a border gateway control function (BGCF) 426. If a packet is coming from a mobile node (MN) or a visited network P-CSCF 420 then analysis can be performed on originating address and/or on the destination address. If both the numbers are not registered within the same network device such as the gateway, then the packets are proxied to an external entity as described in the routing table below.

In some embodiments, demux manager sends packet(s) to the session manager instance that can handle the session or that is already handling the session. To identify the session manager instance handling the session, the demux manager determines whether to analyze based on an originating subscriber address or a destination subscriber address. Based on the network device or the entity the message is coming from, the demux manager can determine whether to look for a source or a destination address. In some embodiments, some proprietary parameter is inserted into a SIP message to aid the decision without much, if any, additional analysis.

The logic in demux manager to identify the session manager can be implemented as follows. Check the via/source address. If this address matches one of the registered address then the packet is coming from the mobile node. Otherwise, if via/source address matches one of the peering server addresses, then use that information to make a routing decision and perform the origination/destination address analysis. Otherwise, if via/source address matches one of the cached server's information received from service route/path, use that information to make the routing decision, and add a direction flag in the subscriber table. Otherwise, do the destination address analysis assuming the call (or packets) is coming from the network and if destination address is also not there in the hash table, then allocate to a new session manager.

The table below describes direction handling of incoming packets by a demux manager and/or session manager when the gateway is acting as a P-CSCF only in accordance with certain embodiments. P-CSCF receives messages from the following components: one or more mobile nodes, a home network I-CSCF, and a home network S-CSCF.

| Incoming interface | Incoming Message | Parameter Handling | Direction analysis |
|---|---|---|---|
| Mobile node to P-CSCF | Register | P-CSCF adds a Path header | Register comes to the P-CSCF from a mobile node. Demux manager allocates a session manager instance and passes the register message to that instance. |
| I-CSCF/ S-CSCF to P-CSCF | 200 ok for Register | P-CSCF stores the service route info. | Demux manager checks for the presence of a service route header to identify the function that is to be performed. If the service route header is present, the message is likely either coming from a S-CSCF or an I-CSCF. Otherwise, the demux manager can perform a destination address analysis to determine direction. |
| MN to P-CSCF | Non register dialog creating request | none | If a security association is present the request goes to the session manager instance handling the session because the messages are sent on the port exchanged during security association setup. The session manager handling the session receives incoming packets on the port exchanged during setup. When received at the session manager either before or instead of at the demux manager, a search similar to the demux manager's search is performed at the session manager to find the direction. If the source IP address is a registered subscriber, then the session manager performs P-CSCF functionality processing. If a security association is not present, demux manager routes the packet(s) to the session manager instance handling the session. A proprietary header can be inserted by the demux manager to indicate whether the message is for originating subscriber or destination subscriber so that CSCF core does not have to perform the same analysis again. Based on the proprietary parameter session manager can be alerted to perform P-CSCF functionality processing. |
| S-CSCF/ I-CSCF to P-CSCF | Non register dialog creating requests | none | The path header information is stored by S-CSCF in the session manager instance and can be sent in incoming requests coming from I-CSCF and S-CSCF in the route header. If this string (pcscf_smgr_instance) is present in the username of the route header, CSCF core performs P-CSCF processing. Also demux manager can be alerted to perform analysis on the destination number and send the analysis to the session manager instance where the destination subscriber is registered. |

The table below describes direction handling of incoming packets by a demux manager and/or session manager when receiving messages or packets for an I-CSCF. An I-CSCF can receive messages from the following interfaces: a home P-CSCF 412, a visited network P-CSCF 418, a home S-CSCF 422, an external I-CSCF 420, an external S-CSCF 422, and an external BGCF 426.

| Incoming interface | Incoming Message | Parameter Handling | Direction analysis |
|---|---|---|---|
| Home/visited P-CSCF | Register | Store address received in via as that is the P-CSCF address. | If path parameter is present, the packet is coming from P-CSCF and the demux manager allocates a session manager (if not a re-registration or de-registration) and passes the register message to the session manager instance. CSCF core checks for the presence of path header. If I-CSCF function is configured and the path header is present in the register message coming from demux manager, I-CSCF is the first contact point for the message and performs I-CSCF functionality. |
| Home S-CSCF | 200 OK for Register | Store service route header. | Since the service route is present demux manager knows the direction, and CSCF core performs I-CSCF function to the packet(s). |
| Home/visited P-CSCF | Non register dialog creating request | none | Demux manager identifies the session manager instance by looking at the route header that includes the session manager instance. CSCF core checks the via. If the via is one of the peering servers or a P-CSCF via address obtained during registration, the CSCF core performs the I-CSCF function for originating subscriber. If topology hiding is not required non register messages can go directly to the S-CSCF by-passing the I-CSCF. |

| Incoming interface | Incoming Message | Parameter Handling | Direction analysis |
| --- | --- | --- | --- |
| External network I-CSCF/ S-CSCF/bgcf | Non register dialog creating request | none | If the packet(s) are not coming from the P-CSCF interface, the packet(s) are bound for a destination subscriber or for proxying to another proxy. Demux manager performs a destination address analysis to determine the session manager instance handling the session. If one is found the packet(s) are routed to that instance. At CSCF core, the packet(s) are checked using the learned P-CSCF address to determine if the packets are coming from the mobile node or a P-CSCF for I-CSCF function processing. Otherwise S-CSCF function processing is performed. |
| Home S-CSCF | Non register dialog creating request | none | Direction handling is performed by the demux manager by looking at the peering server table. |

The table below describes direction handling of incoming packets by a demux manager and session manager when receiving messages or packets for an S-CSCF. A S-CSCF receives messages from the following interfaces: P-CSCF 412, visited network P-CSCF 418, I-CSCF 414, MGCF 424, external I-CSCF 420, external S-CSCF 422, external BGCF 426.

| Incoming interface | Incoming Message | Parameter Handling | Direction analysis |
| --- | --- | --- | --- |
| Home I-CSCF | Register | Store path header info. Add service route. | If path parameter is present, packet(s) are coming from home I-CSCF. The demux manager allocates a session manager (if message is not a re-registration or de-registration) and passes the associated register message packet(s) to the session manager instance. The CSCF core checks for the presence of a path header to determine that the packet(s) are coming from the I-CSCF. |
| Home/visited P-CSCF | Non register dialog creating request | none | Demux manager identifies the session manager instance handling the session by checking the route header that includes the session manager instance. The CSCF core checks the via, and if the via is one of the peering servers or P-CSCF via addresses learned during registration, the CSCF core performs the S-CSCF function for the originating subscriber. If topology hiding is not used non register messages go to the S-CSCF without going to the I-CSCF. |
| External network I-CSCF/ S-CSCF/ BGCF/ MGCF | Non register dialog creating request | none | If the packet(s) are not coming from the P-CSCF interface, the packet(s) are for a destination subscriber or for proxying to another proxy. Demux manager performs a destination address analysis to determine the session manager instance handling the session. If one is found, the packet(s) are routed to that instance. At the CSCF core, the packet(s) are checked using the learned P-CSCF address to determine the packets are not coming from the mobile node or P-CSCF and I-CSCF function processing is performed. Otherwise S-CSCF function processing is performed. |

Figure 5:
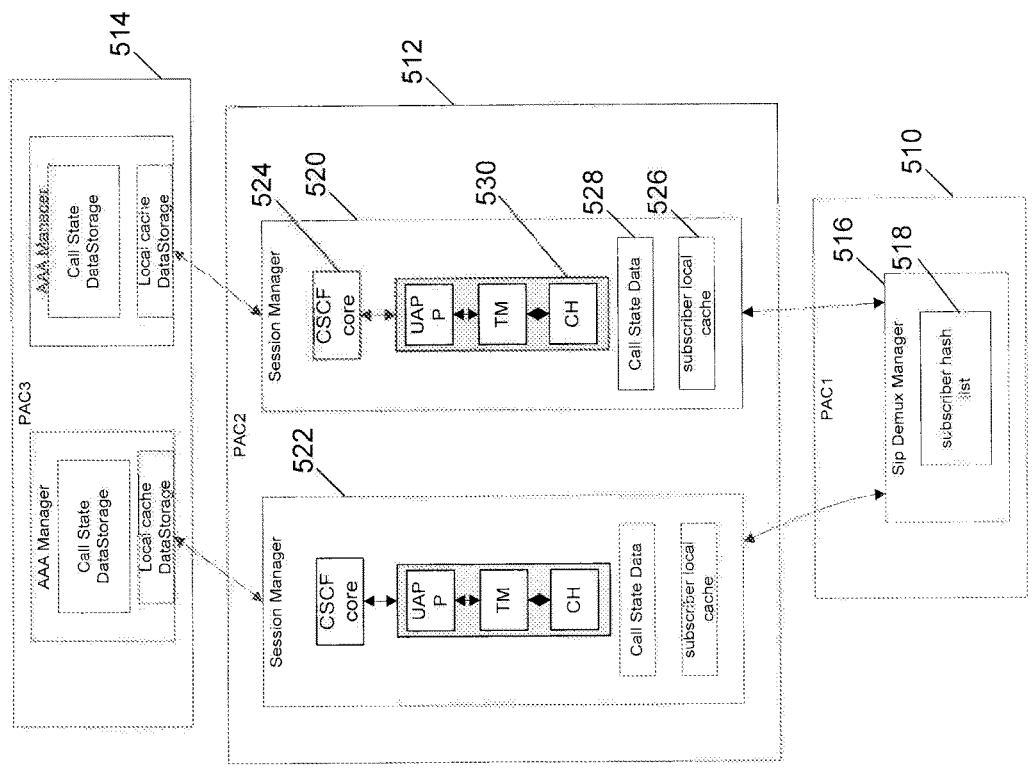
FIG. 5 is a block diagram of an implementation of components within a gateway in accordance with certain embodiments.

From the above tables, it can be appreciated that the demux manager and the session manager, which includes CSCF core functionalities, work together to direct and process packets. FIG. 5 illustrates an implementation of demux and session manager in accordance with certain embodiments. FIG. 5 includes packet accelerator card (PAC) 510, PAC 512, and PAC 514. PACs 510, 512, and 514 may also be implemented in a packet services card (PSC) or any other applicable hardware/software configuration. PAC 510 implements a SIP demux manager 516 which includes subscriber hash list 518. SIP demux manager 516 can be used to direct SIP messaging and packets to the session manager handling the session and to external functions. The SIP demux manager 516 can cache information about a session and a subscriber in a subscriber hash list 518 to reduce delay in directing packets to their corresponding session managers.

PAC 512 implements session manager 520 and 522. Session manager 520 includes a CSCF core 524, a subscriber local cache 526, a call state data 528, and a SIP stack 530. CSCF core 524 can include a P-CSCF, a S-CSCF, and a I-CSCF or can implement the functions of a P-CSCF, a S-CSCF, and/or a I-CSCF on packet(s) in session manager 520. Subscriber local cache 526 includes a number of pieces of information which can be used to reduce lookup times for routing packets from the session manager or reduce direction analysis processing time. For example, AOR/public user identity, private user identity (unique for a subscriber, could be IMSI), contact, registration expiry, registration status (active, expired), service route header/path header, auth vector, and subscriber profile. Call state data includes information about the state of sessions, e.g., registered, alerting, answered, release, and wait, which can be used to make decisions on whether to allocate or deallocate resources and accept or reject messages coming from the network.

SIP stack 530 includes a connection handler (CH), a transaction manager (TM), and a user application (UAPP). The connection handler manages the connections to remote servers over a single communications interface, and handles the formatting and multiplexing of outbound SIP messages as well as the parsing and de-multiplexing of inbound SIP messages. Transaction manager implements the core SIP functionality and supports proxy server, registrar, redirect server, and user agent functionalities. User application manages the correlators and handles used to identify calls, sessions, and transactions in the SIP stack.

By caching information in the SIP demux manager and the session manager, these entities can make routing decisions quicker because lookup time is saved. In some embodiments, the NPU flows can direct the packet flows to the session manager handling the session and the session manager cache can be used for obtaining information regarding the subscriber. The demux manager can direct packets that are not picked up by a NPU flow or are the registration packets from a mobile node, in certain embodiments.

The session manager can act as a registrar and redirect server. A registrar allows the SIP user to register the contact information (IP address/domain name) where the SIP user can be reached. The registrar can be a location service that allows binding between the logical address/public identity of the SIP user with the physical address. A SIP proxy or redirect server can locate the user by contacting the registrar. The registrar can be used by the S-CSCF functionality in the session manager. The P-CSCF and I-CSCF may proxy the registrations. If the session manager is implementing a S-CSCF registrar, registrar 334 (FIG. 3) can contact the CSCF core to get the authentication vector and subscriber information. The registrar can perform the SIP specific registrar functionality, but take directions from the S-CSCF component in CSCF core in some embodiments.

The system of FIG. 3 may maintain a local cache per service or session and also send updates to demux manager of any changes in the registration status because demux manager maintains a local cache as well, in some embodiments. The local cache can store the following information: AOR/public user identity, private user identity (unique for a subscriber, could be IMSI), contact information, registration expiry, registration status (active, expired), service route header, auth vector, and subscriber profile. The local cache entry may be deleted once the subscriber deregisters and may maintain one such entry for every public user identity for that subscriber.

In certain embodiments, information is cached locally to reduce setup delay that is caused from retrieving information from external databases. In some embodiments, when a subscriber registers for a first time, the location information provided in the registration message is stored in the demux manager. A process instance can be allocated for keeping the subscribers call state and contact information. Other information can also be stored. This information is used so that a call coming to or from the demux manager is directed to the process instance handling the session. The information can also be used to distribute the traffic so that a bottleneck does not occur at the demux manager.

In some embodiments, a cache including information from a registration message is used to distribute traffic coming in, e.g., from a public switched telephone network (PSTN) or a SIP interconnect. This can be implemented by storing the IP address and a handle, such as the Address of Record (AoR). The AoR can be a SIP handle such as sip:name@starentnetworks.com or sip:phonenumber@starentnetworks.com;user=phone or a tel:phonenumber which is a tel URI. This handle information is generally stored in another database and lookup can take some time. Thus, when a registration message comes in it can use information, such as the SIP handle and do a reverse lookup in the database and get information including the telephone number to place in the cache. This database information can be used when a request comes in from PSTN with a telephone number. The telephone number can be matched against the information in the cache to route the traffic flow to the process instance handling the call session.

In certain embodiments, a network processing unit (NPU) directs traffic to the process instance that handles the call session bypassing the demux manager and the signaling routing layer (see FIG. 3). The NPU can use a hash key to determine if the demux manager can be bypassed. If there is a hash hit, the traffic is routed directly to a session manager process instance handling the call. In some embodiments, the process instance is inside the call processing layer and can be within the CSCF core. The process instance can be given an internal address so the traffic can be directed to it. This internal address is used by the NPU to send the incoming packet(s) to the correct session manager process instance after a hash hit.

In certain embodiments, the system of FIG. 3 caches subscriber and various network SIP node's presence locally and uses various network addresses learnt during subscriber registration to distribute future traffic among internal CSCF processing functions as well as external CSCF components. This system can also get the tel URI from the ENUM database for the subscriber's address of record (AoR) during registration process itself so that the lookup during call setup time can be avoided in some embodiments.

Figure 6:
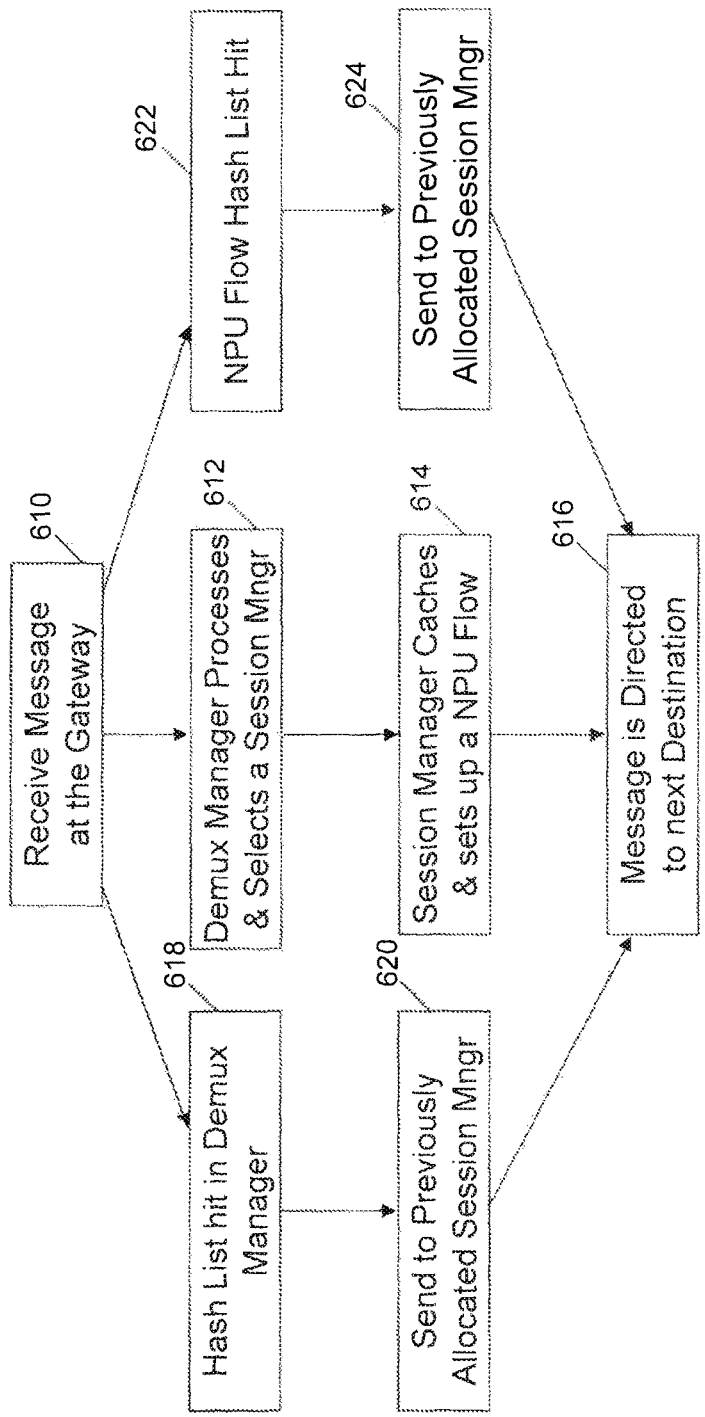
FIG. 6 is a flow diagram of a process of providing packet flow management in accordance with certain embodiments.

FIG. 6 illustrates packet management by the gateway in certain embodiments. At 610, a message or packets are received at the gateway. If the message is a register message or includes information for a new session, the message or packet(s) is processed and analyzed by the demux manager at step 612. The demux manager can cache certain information extracted from the message to aid in routing future messages. The demux manager also selects a session manager for handling the message in 612. The session manager receives the message from the demux manager in 614 and caches a number of fields and other information from the message. The session manager may also setup a NPU flow to direct packet flows in 614. The message can then be directed to the next destination in 616.

If the message has already been assigned a session manager, the demux manager can use a hash list to make a number of routing decisions. In 618, after a message is received at the gateway in 610, the message matches identifying information in the demux manager's hash list. When a match is made against the demux manager, the demux manager sends the packets or message to the previously allocated session manager in 620. The session manager can make further determinations about how the packets or message is to be handled and direct it to the next destination in 616.

If the message has already been assigned a session manager, the message may match against a NPU flow hast list in 622, after being received at the gateway in 610. The NPU flow can redirect a number of common packets or messages using a limited set of information. The NPU flow can be mostly implemented in hardware to decrease delay in routing the packets. The NPU flow can relieve the demux manager from having to inspect each incoming packet. If a packet does not match against the NPU flow it can be sent to the demux manager for routing. In some embodiments the NPU flow passes the packet on to the session manager handling the session for further processing and/or routing in 624. The message is then directed to the next destination in 616.

The gateway described above is implemented in a chassis in some embodiments. This chassis can implement multiple and different integrated functionalities. In some embodiments, an access gateway, a packet data serving node (PDSN), a foreign agent (FA), or a home agent (HA) can be implemented on a chassis. Other types of functionalities can also be implemented on a chassis in other embodiments are a Gateway General packet radio service Support Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

The features of a chassis that implements an enterprise access gateway, in accordance with some embodiments, are further described below. The chassis includes slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

In some embodiments, a ST40 embodiment of the chassis can support a system management card (SMC) and a packet services card (PSC). The system management card is a system control and management card for managing and controlling other cards in the chassis. The packet services card is a high-speed processing card that provides mutli-threaded point-to-point, packet data processing, and context processing capabilities, among other things.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing embodiments, it is understood that the present disclosure has been made only by way of example, and that numerous changes in the details of implementation of the invention may be made without departing from the spirit and scope of the invention, which is limited only by the claims which follow.

We claim:

1. A method comprising:
   receiving a plurality of packets at a gateway;
   in response to a determination, by a network processing unit (NPU) of the gateway, that a first hash lookup, for a first packet of the plurality of packets, produces a hit in a hash list, forwarding the packet to a first process instance of one or more process instances of the gateway, the first process instance corresponding to the hit in the hash list, wherein the first process instance is to store call state data including information about the states of sessions handled by the first process instance;
   in response to a determination, by the NPU of the gateway, that a second hash lookup, for a second packet of the plurality of packets, does not produce a hit in the hash list, forwarding the second packet to a demux manager of the gateway;
   in response to a determination, by the demux manager, that a third hash lookup, for the second packet, does not produce a hit in a second hash list, determining to add a second process instance to handle a new packet flow associated with the second packet, the determination based at least on load information of the first process instance, wherein the second process instance is configured to store call state data including information about the states of sessions handled by the second process instance;
   routing, by the first process instance, the first packet towards a destination address of the first packet; and
   routing, by the second process instance, the second packet towards a destination address of the second packet.

2. The method of claim 1, further comprising sending from the first process instance a limited set of criteria to set up a flow in a network processing unit to forward packets that match the limited set of criteria.

3. The method of claim 1, wherein the hit is based on an originating subscriber address.

4. The method of claim 1, wherein the hit is based on a destination subscriber address.

5. The method of claim 1, wherein the hit is based on an originating subscriber address and a destination subscriber address.

6. The method of claim 1, wherein the first process instance comprises at least a portion of a call session control function (CSCF).

7. The method of claim 1, wherein each process instance comprises a Proxy call session control function (CSCF), an Interrogating CSCF, and a Serving CSCF.

8. The method of claim 1, further comprising selecting a process instance of the first or second process instances for a packet flow based on a load of one or more of the one or more process instances.

9. At least one non-transitory media comprising logic that when executed is operable to:
   receive a plurality of packets at a gateway;
   in response to a determination, by a network processing unit (NPU) of the gateway, that a first hash lookup, for a first packet of the plurality of packets, produces a hit in a hash list, forward the packet to a first process instance of one or more process instances of the gateway, the first process instance corresponding to the hit in the hash list, wherein the first process instance is to store call state data including information about the states of sessions handled by the first process instance;

in response to a determination, by the NPU of the gateway, that a second hash lookup, for a second packet of the plurality of packets, does not produce a hit in the hash list, forward the second packet to a demux manager of the gateway;

in response to a determination, by the demux manager, that a third hash lookup, for the second packet, does not produce a hit in a second hash list, determine to add a second process instance to handle a new packet flow associated with the second packet, the determination based at least on load information of the first process instance, wherein the second process instance is configured to store call state data including information about the state of sessions handled by the second process instance;

route, by the first process instance, the first packet towards a destination address of the first packet; and route, by the second process instance, the second packet towards a destination address of the second packet.

10. The at least one media of claim 9, wherein the logic when executed is further operable to send from the first process instance a limited set of criteria to set up a flow in a network processing unit to forward packets that match the limited set of criteria.

11. The at least one media of claim 9, wherein the hit is based on an originating subscriber address.

12. The at least one media of claim 9, wherein the hit is based on a destination subscriber address.

13. The at least one media of claim 9, wherein the hit is based on an originating subscriber address and a destination subscriber address.

14. The at least one media of claim 9, wherein the first process instance comprises at least a portion of a call session control function (CSCF).

15. The at least one media of claim 9, wherein each process instance comprises a Proxy call session control function (CSCF), an Interrogating CSCF, and a Serving CSCF.

16. The at least one media of claim 9, wherein the logic when executed is further operable to select a process instance of the first or second process instances for a packet flow based on a load of one or more of the one or more process instances.

17. A gateway comprising:
at least one interface; and
at least one network processing unit (NPU) configured to:
   receive a plurality of packets from the at least one interface;
   in response to determining that a first hash lookup, for a first packet of the plurality of packets, produces a hit in a hash list, forward the packet to a first process instance of one or more process instances of the gateway, the first process instance corresponding to the hit in the hash list, wherein the first process instance is configured to store call state data including information about the states of sessions handled by the first process instance;
   in response to determining that a second hash lookup, for a second packet of the plurality of packets, does not produce a hit in the hash list, forward the second packet to a demux manager;
wherein the demux manager is configured to, upon determining that a third hash lookup, for the second packet, does not produce a hit in a second hash list, determine to add a second process instance to handle a new packet flow associated with the second packet, the determination based at least on load information of the first process instance, wherein the second process instance is configured to store call state data including information about the states of sessions handled by the second process instance;
wherein the first process instance is configured to route the first packet towards a destination address of the first packet; and
wherein the second process instance is configured to route the second packet towards a destination address of the second packet.

* * * * *

UNITED STATES PATENT AND TRADEMARK OFFICE
CERTIFICATE OF CORRECTION

PATENT NO.         : 10,103,991 B2
APPLICATION NO.    : 14/972677
DATED              : October 16, 2018
INVENTOR(S)        : Kaitki Agarwal et al.

It is certified that error appears in the above-identified patent and that said Letters Patent is hereby corrected as shown below:

On the Title Page

On the page 3, in Column 2, under "Other Publications", Line 41, delete "U52009" and insert -- US2009 --, therefor.

On the page 3, in Column 2, under "Other Publications", Line 44, delete "U507" and insert -- US07 --, therefor.

On the page 3, in Column 2, under "Other Publications", Line 46, delete "U507" and insert -- US07 --, therefor.

On the page 3, in Column 2, under "Other Publications", Line 48, delete "U52008" and insert -- US2008 --, therefor.

On the page 3, in Column 2, under "Other Publications", Line 50, delete "U52007" and insert -- US2007 --, therefor.

On the page 3, in Column 2, under "Other Publications", Line 53, delete "U509" and insert -- US09 --, therefor.

In the Drawings

On sheet 3 of 6, in Figure 3, Line 11, delete "CallProcessing" and insert -- Call Processing --, therefor.

On sheet 5 of 6, in Figure 5, reference numeral 514, Line 4, delete "DataStorage" and insert -- Data Storage --, therefor.

On sheet 5 of 6, in Figure 5, reference numeral 514, Line 4, delete "DataStorage" and insert -- Data Storage --, therefor.

Signed and Sealed this
First Day of January, 2019

Andrei Iancu
*Director of the United States Patent and Trademark Office*

On sheet 5 of 6, in Figure 5, reference numeral 514, Line 6, delete "DataStorage" and insert -- Data Storage --, therefor.

On sheet 5 of 6, in Figure 5, reference numeral 514, Line 6, delete "DataStorage" and insert -- Data Storage --, therefor.

In the Specification

In Column 11, Line 10, delete "registerted," and insert -- registered, --, therefor.

In Column 14, Line 27, delete "mutli-" and insert -- multi- --, therefor.

In Column 15, Line 44, delete "Difsery" and insert -- Diffserv --, therefor.